(12) United States Patent
Meirav

(10) Patent No.: US 6,726,558 B1
(45) Date of Patent: Apr. 27, 2004

(54) OXYGEN ENRICHMENT OF INDOOR HUMAN ENVIRONMENTS

(76) Inventor: Udi Meirav, 146 Lincoln St., Newton, MA (US) 02461

( * ) Notice: Subject to any disclaimer, the term of this patent is extended or adjusted under 35 U.S.C. 154(b) by 0 days.

(21) Appl. No.: 10/305,297

(22) Filed: Nov. 26, 2002

(51) Int. Cl.⁷ .................................................. F24F 7/00
(52) U.S. Cl. ...................................... 454/256; 454/187
(58) Field of Search ................................ 454/338, 261, 454/256, 254, 187

(56) References Cited

U.S. PATENT DOCUMENTS

| | | | |
|---|---|---|---|
| 3,593,711 A | * 7/1971 | Staub et al. ........... 128/202.26 |
| 3,758,029 A | * 9/1973 | Yoshida ..................... 236/49.2 |
| 3,875,957 A | 4/1975 | Veit et al. |
| 4,036,253 A | 7/1977 | Fegan et al. |
| 4,164,172 A | * 8/1979 | Anderten et al. ........... 454/229 |
| 4,848,333 A | 7/1989 | Waite |
| 5,036,852 A | 8/1991 | Leishman |
| 5,037,518 A | 8/1991 | Young et al. |
| 5,172,687 A | * 12/1992 | Donnerhack et al. .. 128/205.26 |
| RE34,434 E | * 11/1993 | Campbell et al. ............. 96/110 |
| 5,372,129 A | 12/1994 | Ryder |
| 5,589,052 A | 12/1996 | Shimamune et al. |
| 5,690,797 A | 11/1997 | Harada et al. |
| 5,706,801 A | 1/1998 | Remes et al. |
| 5,709,732 A | 1/1998 | Prasad |
| 5,742,516 A | * 4/1998 | Olcerst ....................... 700/276 |
| 5,895,318 A | * 4/1999 | Smrt ........................... 454/256 |
| 6,190,441 B1 | * 2/2001 | Czabala et al. ............... 96/130 |
| 6,191,694 B1 | 2/2001 | Brownlee |
| 6,314,957 B1 | * 11/2001 | Boissin et al. ......... 128/204.17 |

* cited by examiner

*Primary Examiner*—Derek Boles
(74) *Attorney, Agent, or Firm*—Mintz, Levin, Cohn, Ferris, Glovsky and Popeo, P.C.; Ivor R. Elrifi; Matthew Pavao

(57) ABSTRACT

This invention provides systems and methods of supplying oxygen-enriched air to an enclosed space or compartment. The systems and methods may distill oxygen from ambient air by a molecular sieve pressure cycle mechanism, such as a pressure swing absorption, may generate oxygen from water using electricity or may use oxygen enriched air produced by membrane filtration. The invention helps people improve their wellness, productivity and comfort, improve performance of mental and/or physical tasks, increase their alertness, quality of life and pleasure, reduce their drowsiness, and aid in curing and preventing disease by increasing the percentage of oxygen in the enclosed space to a beneficial and safe level.

65 Claims, No Drawings

OXYGEN ENRICHMENT OF INDOOR HUMAN ENVIRONMENTS

FIELD OF THE INVENTION

This invention relates generally to systems and methods for supplying oxygen enriched air to an enclosed space for prolonged or constant human consumption. The systems and methods may distill oxygen from ambient air by a molecular sieve pressure cycle mechanism, such as a pressure swing absorption, may generate oxygen from water using electricity or may use oxygen enriched air produced by membrane filtration. The system may include an oxygen battery, sensor and regulator for controlling and regulating the oxygen or oxygen-enriched air to maintain the oxygen content of the air in the enclosed space within an optimum range.

BACKGROUND OF THE INVENTION

The most vital element on earth is oxygen. Without it, human life simply could not exist. Oxygen is about 21% by volume (about 23% by weight) of our natural atmosphere, regardless of climate, altitude and geography. It is believed that in the past, atmospheric oxygen levels were higher, perhaps significantly so, than today. The decrease in oxygen content of ambient air during the last couple of centuries may be a result of reductions in plant life and/or increases in the use of fossil fuels, among other factors. Oxygen levels may have exceeded 35% in prehistoric times.

There is little doubt that lower oxygen levels impair physical and mental function. In urban areas and enclosed spaces, oxygen levels can be substantially lower than 21%. In high altitudes, relative oxygen concentration is the same but all gases are rarefied, which is equivalent to lower oxygen levels.

The level of carbon dioxide ($CO_2$) in our blood triggers breathing, not the amount of oxygen. Humans are not very good at compensating for low or high oxygen levels by breathing more or less. The benefit of higher oxygen concentration is that getting more oxygen, at least some of the time, is highly desirable. Medical treatment for intensive care and for very sick patients routinely uses high purity oxygen.

Hyper baric oxygen treatment is a very common form of alternative medicine believed by many to have broad health benefits ranging from aging and aches to cancer and infectious diseases. Oxygen bars have cropped up that offer healthy patrons pure oxygen inhalation. There are books and groups espousing the therapeutic value of increased oxygen intake and its critical role in vast array of common ailments.

Oxygen separation is a well-established technology. Purified oxygen is the third largest bulk chemical market. It is of critical importance in industrial processes, medicine, research and development and aquaculture. In the future, purified oxygen could have dramatic positive impact on energy generation and reduction of air pollution.

Several technologies exist for separating oxygen from air. One technology is Pressure Swing Adsorption (PSA) devices which are used for smaller, on-site applications. This technology was originally developed in the 1950s–1960s. Another technology is cryogenic separation, which is often used, in large industrial facilities.

New oxygen separation technologies are being developed. There are significant ongoing efforts in industry and academic research to find cheaper and more efficient ways to separate pure oxygen. Most of these methods are based on diffusion or filtering through new materials such as ceramics, membranes, etc. All of these efforts target existing industrial and medical applications. A particular important target is making it economically feasible to use enriched oxygen in burning fossil fuels.

SUMMARY OF THE INVENTION

The present invention includes an oxygen-enrichment system, the system may include oxygen distilled from ambient air using a molecular sieve pressure cycle mechanism fed into the enclosed space, may include an electrolyzing system for evolving gaseous oxygen from water and feeding the oxygen into the enclosed space, may use oxygen from a storage tank or tanks adjoining the enclosed space, or may include a membrane system to produce oxygen-enriched air which is fed into the enclosed space. The invention may include a sensor and regulator that detects the oxygen content of the air in the enclosed space and controls the oxygen supply to regulate the oxygen flow into the enclosed space. The system can be set to flow oxygen-enriched air into the enclosed space if the percent of oxygen in the enclosed space falls to or below a pre-selected value and shut off the supply of oxygen-enriched air when the oxygen content rises to a pre-selected value. The system may include a diluter to reduce the concentration of the oxygen that is supplied into the enclosed space.

The optimum percent of oxygen in the enclosed space for increasing alertness, improving productivity and comfort, reducing drowsiness, and increasing overall well-being need be only a few percent above the percent of oxygen in ambient air. It is believed that raising the percent oxygen to a range of about 25–40% by volume can substantially increase the alertness, productivity, comfort and overall well being of people breathing the air. It is desirable to keep the oxygen content in the enclosed space from exceeding approximately 40% by volume to minimize a possible risk of fire hazard or oxygen toxicity in the enclosed space.

This invention also provides a method for providing a small increase in the oxygen content of air in enclosed spaces using the disclosed systems. The invention provides a method that helps people increase their alertness, improve their productivity and comfort, reduce their drowsiness, improved metabolism and increase their overall well-being and prevent disease.

The details of one or more embodiments of the invention are set forth in the accompanying description below. Although any methods and materials similar or equivalent to those described herein can be used in the practice or testing of the present invention, the preferred methods and materials are now described. Other features, objects, and advantages of the invention will be apparent from the description. In the specification and the appended claims, the singular forms also include the plural unless the context clearly dictates otherwise. Unless defined otherwise, all technical and scientific terms used herein have the same meaning as commonly understood by one of ordinary skill in the art to which this invention belongs. All patents and publications cited in this specification are incorporated herein by reference.

DETAILED DESCRIPTION

In one embodiment, the present invention includes a system for producing and supplying oxygen-enriched air to an enclosed space or compartment. In preferred embodiments, the enclosed space includes, but is not limited to a residence, room, house, apartment, building, theater, shopping center, hotel, office, industrial facility, commercial facility, commercial venue, passenger car, truck, van, bus, tractor, ship, boat, submarine, aircraft, train or subway car. As used herein, the phrase "enclosed space" is used to mean any space that is not open or outdoors or any space which can be separated from the ambient air by partition.

Molecular Sieve Pressure Cycle Mechanism

In a preferred embodiment, the oxygen producing system distills oxygen from ambient air by a molecular sieve pressure cycle mechanism to deliver oxygen-enriched air to an enclosed space. The system preferably includes an oxygen concentration sensor for measuring the oxygen content in the enclosed space, a regulator for opening and closing a valve and feeding oxygen into a conduit or pipe. The conduit or pipe is utilized to flow oxygen to the enclosed space from the oxygen generator/producer.

The system enriches the oxygen content of the air in an enclosed space to a safe level that helps people improve their wellness, productivity, metabolism or comfort, improve performance of mental and/or physical tasks, increase their alertness, quality of life and pleasure, reduce their drowsiness, and aid in curing and preventing disease.

Oxygen sensors are well known in the art as disclosed by U.S. Pat. Nos. 5,036,852 and 5,706,801, the disclosures of which are incorporated herein by reference. Oxygen concentration sensors are commercially available. In preferred embodiments, the sensor can be optical, electrical or chemical.

The system further includes a regulator for controlling or regulating the flow of oxygen from the molecular sieve pressure cycle mechanism through the conduit into the enclosed space. The regulator receives the measurement from the sensor and operates much like a thermostat to regulate oxygen flow. The regulator starts the flow of oxygen when the percent oxygen concentration in the enclosed space falls to or below a pre-selected percent, such as 21–23% by volume, preferably 21%, and stops the flow when the concentration rises to a preselected percent such as 35–40% by volume, preferably 40%. In additional embodiments, the oxygen concentration of the air in the enclosed space is maintained at any percentage between 21–40% oxygen by volume (i.e. 21%, 22%, 23% . . . up to and including 40%).

The oxygen sensor and regulator are also referred to herein as oxystat. In a preferred embodiment, the oxygen concentration percentage is determined, maintained and regulated by an oxystat. In another embodiment, the oxygen concentration sensor and regulator can maintain the oxygen concentration of air in the enclosed space within a safe range. The safe range can be any percentage between 21–40% oxygen by volume but not exceed 40% oxygen by volume.

The regulator can optionally regulate the flow of oxygen-enriched air to the enclosed space either by switching the molecular sieve pressure cycle mechanism on and off or by operating a valve, which controls the oxygen-enriched air flow into the enclosed space. Computer controlled regulators for such purposes are well known in the art.

The system may further include an automatic shutoff system. The automatic shutoff system prevents oxygen from being directed to the enclosed space when the enclosed space is opened to ambient air or when a fire hazard is identified. The fire hazard that is identified can be a smoke detector, fire alarm, sprinkler system, infra-red sensing or other means of detecting fire. The system may also include a diluter, as described below, for diluting the oxygen before it is fed through conduit into the enclosed space.

For safety reasons, it is critical that the second pre-selected oxygen content for shutting the molecular sieve pressure cycle mechanism off be at a safe level which does not create a risk of rapid combustion of lighted objects such as cigarettes or other combustibles that might be intentionally or accidentally ignited in the enclosed space. However, significant increases in wellness, productivity, metabolism or comfort, improved performance of mental and/or physical tasks, increased alertness, quality of life and pleasure, reduced drowsiness, and aid in curing and preventing disease should result from small increases (such as 2–15% increases) in the oxygen content in the enclosed. Such small increases are safely below an oxygen level that might be hazardous.

In a preferred embodiment, the molecular sieve pressure cycle mechanism is a pressure swing adsorption (PSA) apparatus, which moderately increases oxygen concentration levels. The benefit of elevated oxygen concentration in an enclosed space may only require moderate enhancement of ambient concentration (i.e. up to ~40%).

PSA, with slight modifications, is a very attractive solution for enriching the ambient oxygen concentration. This system is similar in many ways to air condition systems due to its low maintenance and moderate energy consumption. Oxygen throughputs of most commercially available PSA systems today are modest, typically 3–100 liters of 95% pure oxygen per minute. In a preferred embodiment, the PSA apparatus, or other oxygen separator, can be used in combination with a supplemental oxygen source, i.e. oxygen battery, to allow rapid increase in oxygen concentration. An oxygen battery can be used in vehicles or other enclosed spaces that by their nature are not to be constantly enriched. The oxygen battery source allows rapid increase of oxygen concentration to desired, safe levels when needed, without requiring very large constant throughput from the PSA apparatus, or other oxygen separator. In another embodiment, the oxygen battery is a refillable container that is kept filled or charged by the PSA apparatus, or other oxygen producer, when it is depleted. Therefore, in this embodiment, the PSA apparatus, or other oxygen producer, has dual role of supplying oxygen-enriched air to the enclosed space, when in use, and recharging the oxygen battery when needed. In an additional embodiment, the system may also include an oxygen or automatic shunt which directs produced oxygen to the oxygen battery when the enclosed space is opened to ambient air.

In a preferred embodiment, the system enriches the enclosed space with oxygen, such that said enriched enclosed space has elevated oxygen content for a prolonged or extended period of time. A prolonged or extended time period means several consecutive hours or days. In a preferred embodiment, a prolonged or extended period of time means at least three hours a day or at least four days a week. In another preferred embodiment, a prolonged or extended period of time means at least four days a week for three hours a day.

In a preferred embodiment, the present invention includes a method where supplying oxygen-enriched air to a enclosed space for a prolonged period of time helps people improve their wellness, productivity, metabolism or comfort, improve performance of mental and/or physical tasks, increase their alertness, quality of life and pleasure, reduce their drowsiness, and aid in curing and preventing disease.

Higher throughput on-site oxygen purification systems are also possible as high flux is required only to initially charge the enclosed space, with much lower flux required subsequently to sustain an elevated concentration. The initial high flux could be delivered from the oxygen battery (i.e. tank or container) that is constantly kept charged in the background, as described herein.

Traditional PSA based oxygen enrichment systems operate a regular cycle of highpressure and low-pressure steps, each of a particular duration. During each cycle most of the gas components of the air other than oxygen are adsorbed onto a molecular sieve, after which the purified oxygen is extracted, and later the unwanted adsorbed gases are released as exhaust, at which point the system is ready for another cycle with newly supplied air.

By shortening the amount of time allowed for adsorption, or changing the pressure or amount of gas introduced in each cycle, substantial amounts of nitrogen may remain unadsorbed, namely, still mixed with the free oxygen when the latter is extracted. Although PSAs are seldom designed to operate that way (because there has been little use for moderatelyenriched $O_2$—$N_2$ mixtures until now), it is feasible and potentially advantageous to do so, as it allows a shorter pressure cycle with, in effect, higher throughput, or alternatively the use of a smaller molecular sieve to achieve the same throughput with lower costs or lower space requirements.

In a preferred embodiment the pressure swing adsorption system is designed to produce partially enriched air with oxygen concentration of 22% to 75% by volume. In additional embodiments, the partial elevation of oxygen concentration allows higher throughput of enriched air as compared with a similar system designed to produce purified oxygen. The partial concentration of oxygen is obtained by shortening the duration of the adsorption cycle whereby allowing only partial adsorption and removal of the ambient nitrogen, by reducing the adsorption capacity of the molecular sieve, or by increasing the pressure differential during the cycle. The system is capable of easily changing its output gas to any desired level of oxygen concentration simply by changing the timing and duration of the pressure cycle. The system can be used to remove carbon dioxide, carbon monoxide and other unwanted gases from the enriched air without necessarily elevating its oxygen concentration.

The deployment of oxygen-enriched air can be accomplished by incorporating oxygen-enriched air flow into a central ventilation system, heating system, air conditioning system or other climate control system. The flow can also be incorporated into a stand alone window unit or room unit. The system also incorporates an oxystat into the thermostats or control units. Therefore, it can be part of a feedback system to control the desired oxygen concentration much like a thermostat. It can be utilized for passive monitoring or active regulation of oxygen levels. It can also be a part of multiple zones within a residence or facility, if needed, much like heat or air conditioning. The multiple zones can be controlled within different target ranges from a single source.

The oxygen supply system utilizing a PSA apparatus can be a closed loop system. The PSA supplying the oxygen-enriched air can receive some of its oxygen feedstock from the target enclosed space. This avoids discarding enriched air or over pressuring the enclosed space. Alternatively, the PSA can use the enclosed space feedstock in combination with additional external feedstock. This would guarantee pressure balance with the outside environment. This can also be used to flush out the molecular sieve during the desorption cycle.

A typical bedroom contains ~50,000 liters of air and a moderate-sized single family residence about ten times that amount. It would take approximately 10,000 liters of oxygen to double the concentration from 20% to 40% in a single room. It would take several hours to bring a single room to 40% with a 50 liter/min unit. It would take a day or two to charge an entire house with 100,000 liters. In order to allow a quick ramp-up or increase, a high pressure external oxygen battery (i.e. storage tank) can be kept charged at all times without the need for an expensive high-throughput concentrator. For example, a standard upright gas cylinder can store up to 10,000 liters.

Utilization of a PSA apparatus with oxygen-enrichment systems further allows the selective removal of pollutants and unwanted gases from the air as part of the oxygen enrichment cycle. Most gases are adsorbed in the molecular sieve process so that oxygen-enriched air is very low in $CO_2$, humidity and pollutant gases like carbon monoxide (CO) and nitrous oxide (NOx) among others. This is particularly true if the PSA cycle is designed to produce moderate oxygen concentrations and high throughput, as described above, for it will replace most of the ambient air with air that has been purified in this manner. Particularly beneficial in highly polluted environments including, but not limited to; heavy traffic, industrial zones or dense urban areas. In another embodiment, the pressure swing adsorption apparatus selectively removes pollutants and unwanted gases from ambient air, such that purified oxygen-enriched air is produced.

In a preferred embodiment, the invention includes a method for supplying oxygen-enriched air to a enclosed space to help people improve their wellness, productivity, metabolism or comfort, improve performance of mental and/or physical tasks, increase their alertness, quality of life and pleasure, reduce their drowsiness, and aid in curing and preventing disease. The method includes the use of the PSA system described above. The method can increase the oxygen concentration of the air in the vehicle's enclosed space within a safe range, such as, about 21–40% oxygen by volume but not exceed 40% by volume.

In a preferred embodiment, the system described above can be used to supply oxygen-enriched air to an enclosed space in a vehicle. The system is similar to the oxygen-enrichment system described above. The system can include a PSA for producing the oxygen enriched air, a conduit or pipe for flowing the oxygen enriched air to the vehicle's enclosed space, an oxygen battery, an oxygen concentration sensor for measuring oxygen content in the vehicle's enclosed space and an apparatus for maintaining the oxygen content in the vehicle's enclosed space within a safe range of 26–40% oxygen by volume. In another embodiment, the oxygen content of the air in the vehicle's enclosed space is maintained at any percentage between 26–40% oxygen by volume (i.e. 26%, 27%, 28% . . . up to and including 40%). The apparatus for determining and maintaining the oxygen content can be a oxystat or a sensor/regulator device. The oxygen battery can rapidly increase the concentration in the vehicle's enclosed space. The oxygen battery can be a refillable container which is filled by the PSA.

In a preferred embodiment, the PSA enriches said enclosed space with oxygen, such that said enriched enclosed space has elevated oxygen content for a prolonged period of time. In a preferred embodiment, a prolonged or extended period of time means at least one hour a day. In a preferred embodiment, the oxygen concentration of the air in said enclosed space is increased within a safe range of 26–40% oxygen by volume for a long period of time.

The present invention also includes a method of supplying oxygen-enriched air to a enclosed space for a prolonged period of time helps people improve their wellness, productivity, metabolism or comfort, improve performance of mental and/or physical tasks, increase their alertness, quality of life and pleasure, reduce their drowsiness, and aid in curing and preventing disease.

In additional embodiments, the PSA can include an automatic shutoff system, which prevents oxygen from being directed to the enclosed space when the enclosed space is opened to ambient air, as by opening a door or a window, or when a fire hazard is identified. The fire hazard can be identified by a smoke detector, fire alarm, sprinkler system, infra-red sensing or other means of detecting fire. It can also include an oxygen shunt, which directs produced, oxygen to the oxygen battery when the enclosed space is opened to ambient air. The PSA may selectively removes pollutants and unwanted gases from ambient air, such that purified oxygen-enriched air is produced. The PSA can be a closed loop system, where the closed loop PSA receives part of its oxygen feedstock from the vehicle's enclosed space for producing oxygen-enriched air for the same enclosed space.

In a preferred embodiment, the conduit is incorporated into a ventilation or climate control system for flowing the oxygen-enriched air from the PSA into the vehicle's enclosed space.

In a preferred embodiment, the invention includes a method for supplying oxygen-enriched air to a enclosed space in a vehicle to help people improve their wellness, productivity, metabolism or comfort, improve performance of mental and/or physical tasks, increase their alertness, quality of life and pleasure, reduce their drowsiness, and aid in curing and preventing disease. The method includes the use of the PSA system described above. The method can increase the oxygen concentration of the air in the vehicle's enclosed space within a safe range, such as, about 26–40% oxygen by volume but not exceed 40% by volume.

Electrolyzer

In another embodiment, the oxygen generating system comprises an electrolyzing unit, a container for water, a sensor and a regulator. The system preferably uses deionized or distilled water to avoid or minimize build-up of scale and debris in the electrolyzer. Electrolyzing devices are well known in the art as is disclosed in U.S. Pat. Nos. 5,037,518; 5,589,052; and 5,690,797, the disclosures of which are incorporated herein by reference. Such electrolyzing systems can generate high purity gases under pressure in a safe manner without need for gas compressors. Apparatuses for generating gaseous oxygen are commercially available.

The electrolyzer produces gaseous hydrogen, as well as oxygen. The hydrogen gas may be used to power hydrogen fuel sells, an internal combustion engine, or alternatively it can be exhausted to the atmosphere. The hydrogen gas is produced in relatively small quantities, and can be dispersed safely and easily into the ambient air. However, use of hydrogen, as a fuel supplement may be desirable.

The system further has a pipe or conduit device for flow of oxygen to the enclosed space from the oxygen generator and a conduit for flow of hydrogen to a fuel cell, engine or to an outside vent. The generation of oxygen and hydrogen by the electrolyzer can produce sufficient gas pressure to move the gases through the conduits without need for a compressor, fan or other such device, but such flow-enhancing devices are also anticipated for use in this invention.

The system works much like the system disclosed above to enrich the oxygen content of the air in an enclosed space to a safe level that helps people improve their wellness, productivity and comfort, increase their alertness, quality of life and pleasure, reduce their drowsiness, and aid in curing and preventing disease and increased overall well-being. The system preferably includes an oxygen sensor or other measuring device for sensing and measuring the oxygen content in the air in the enclosed space and further includes a regulator for controlling or regulating the flow of oxygen from the electrolyzer through the conduit into the enclosed space as described for the molecular sieve pressure cycle mechanism above.

The system also preferably includes an oxygen dilution device for diluting the concentration of the oxygen in the air that is fed into the enclosed space through the conduit. Diluter devices are well known in the art as, for example, are disclosed by U.S. Pat. Nos. 3,875,957; 4,036,253; 4,848,333; and 5,372,129, the disclosures of which are incorporated by reference. The dilution device reduces the concentration of oxygen from approximately 100%, as it comes from the electrolyzer, down to approximately 40–50% oxygen, so it can be safety fed into the enclosed space. The diluter can use outside (fresh) air or recirculated air from the enclosed space for mixing with the oxygen to dilute it. Dilution of the oxygen is desirable to reduce the possibility that highly concentrated oxygen could be a fire hazard if it contacts combustibles in the enclosed space. It may also be desirable that the outlet for feeding oxygen-enriched air into the enclosed space be located such that the enriched air will not contact combustibles until the air is further diluted by air in the enclosed space. Such location could be, for example, within a ventilation duct, heating system, or air conditioning system.

Dilution of a gas stream containing 100% oxygen down to an oxygen-enriched air stream containing about 40–50% oxygen means that the 100% oxygen is diluted with about 5–18 volumes of air depending on the oxygen content of the feed air and the desired oxygen content of the enriched air. If the feed air is outside air, it will have an oxygen content of about 20% by volume, whereas recirculated air from the enclosed space might have up to about 35–40% oxygen content.

It may be desirable for the system to be limited to two settings for the dilution ratios, one when the oxygen is diluted by fresh air and the other when the oxygen is diluted by recirculated air so that the oxygen content of the enriched air never exceeds a relatively low level such as about 35–40% oxygen. Alternatively, the system may employ an oxygen sensor that detects the percent oxygen in the enriched air and a regulator to control the amount of dilution to a predetermined safe percent. This offers the further advantage of increased effectiveness while minimizing risks of fire hazard. The dilution level could be maintained at a level that would safely and quickly raise the oxygen content in the enclosed space without need for excessive air flow. If the enriched air has low oxygen content, such as about 40–50%, then higher air flow would be required to raise the oxygen content of the air in the enclosed space to a desired level of about 35–40% within a reasonable period of time.

Oxygen Tank

In another embodiment, the present invention includes an oxygen supply system that uses oxygen from a tank(s) to deliver oxygen-enriched air to an enclosed space. The system includes a sensor for measuring the oxygen content in the enclosed space, a regulator for opening and closing a valve and feeding oxygen into conduit, and a diluter for diluting the oxygen before it is fed through conduit into the enclosed space. The tank or tanks may be located in a space adjoining the enclosed space or other space so that oxygen can be easily fed from the tank to the enclosed space. The system works much like the system disclosed above to enrich the oxygen content of the air in a enclosed space to a safe level that helps people increase their alertness, improve their productivity and comfort, reduce their drowsiness, and increase their overall well-being. A tank is also referred to herein as a gas cylinder. These terms are utilized interchangeably. In a preferred embodiment, the oxygen tank is not the oxygen producing source but rather serves as the oxygen battery as described herein.

Membrane Filtration In another embodiment, the present invention includes an oxygen-enrichment system as described above that further includes an oxygen-enrichment membrane to separate an oxygen-enriched portion of ambient air, which is fed into an enclosed space. Membranes for separating an oxygen-enriched component of gas are well known in the art. U.S. Pat. No. 5,709,732 discloses a variety of such membranes. Single and multiple stage membranes are known for producing oxygen-enriched gas. The membranes typically comprise hollow fiber membranes in bundles/modules. Ambient air is compressed and flows along the fiber bundle. A membrane can be selected that is more permeable to oxygen than to nitrogen, so an oxygen-enriched permeate gas and a nitrogen-enriched retentate gas are produced. A single stage system will produce modest increase in the permeate of up to about 30° $O_2$ depending on the fibers. Additional stages may be used to produce more highly purified oxygen. The disclosure of that patent and the references cited in the patent are incorporated herein by reference.

The system preferably includes a compressor for compressing ambient air that is fed into the membrane to separate an oxygen-enriched permeate gas and from a nitrogen-enriched retentate that is preferably exhausted to the atmosphere. The permeate may desirably have an oxygen content of about 40–50%. As used herein "membrane" means a bundle or module of hollow fibers that are more permeable to oxygen than to nitrogen. The system also preferably includes a filter for filtering out dust and other solid impurities that could adversely affect the membrane. The filter may be of a variety of well known designs such as a typical air filter for internal combustion engines or indoor ventilation systems.

The system may include a diluter such as that disclosed above. However, a diluter is not required if a membrane system is selected that produces oxygen-enriched permeate gas that is low enough in oxygen content that it can be fed into the enclosed space without undue risk of undesirable combustion in the compartment. Oxygen-enriched permeate having an oxygen concentration of 40–50% may provide the desired enrichment of the air in the enclosed space, provided the volume flow is at a reasonable level, without undue risk of accidental combustion.

The system may optionally include a sensor for measuring the oxygen content of the air in the enclosed space as is described above and an associated switch responsive to the sensor for switching the compressor on and off, depending on the oxygen concentration in the enclosed space. The sensor can be optical, electrical or chemical. The system may also have an on-off switch for manually switching the system on and off. The switch may be adjoining or located in the enclosed space.

One advantage of a membrane type system is that it may obviate any need to continuously measure the oxygen content of the air in the enclosed space to regulate the system. Instead, a system can be provided that produces oxygen-enriched air containing approximately 40–50% oxygen in sufficient quantities that the system will raise the oxygen concentration in the enclosed space to the desired concentration within a relatively few minutes.

This approach is particularly attractive for automotive applications where quick charging is of the essence and the volumes are much smaller. A typical vehicle enclosed space may have an air space of about 200 to 600 cubic feet. A membrane type oxygen-enrichment system that has a capacity of producing approximately 100 to 300 or more cubic feet per minute (cfm) of oxygen-enriched air would quickly increase the oxygen content of the air in the vehicle enclosed space to a desired concentration. The air flow capacity and oxygen-enrichment capacity of a system could be matched with the size of a vehicle enclosed space to operate the system continuously without risk of reaching excessive oxygen concentration in the air in the vehicle enclosed space.

In another embodiment, the system includes a two-stage oxygen-enrichment system for use in this invention. The two-stage oxygen-enrichment system includes two compressors and two air separation membranes for enriching the oxygen content of the air that is fed into enclosed space. This two-stage system optionally includes an oxygen measuring sensor for measuring the concentration of oxygen in the enclosed space and switching one or both of the compressors on and off to regulate the concentration of the oxygen in the enclosed space. The sensor can be optical, electrical or chemical. The two-stage system may also include a filter for filtering out air-bone impurities from the ambient air that is pulled into the compressor.

Cryogenic Separation Mechanism

In another embodiment, the present invention includes an oxygen-enrichment system as described above that further includes a cryogenic separation mechanism to separate an oxygen-enriched portion of ambient air, which is fed into an enclosed space. The system includes a sensor for measuring the oxygen content in the enclosed space, a regulator for opening and closing a valve and feeding oxygen into conduit, and a diluter for diluting the oxygen before it is fed through conduit into the enclosed space. This system works much like the system disclosed above to enrich the oxygen content of the air in a enclosed space to a safe level that helps people increase their alertness, improve their productivity and comfort, reduce their drowsiness, and increase their overall well-being.

Method of Producing Oxygen-Enriched Air

In a preferred embodiment, the present invention provides a method for supplying a beneficial quantity of oxygen-enriched air to an enclosed space in a safe and efficient manner utilizing any of the systems described herein. The method can significantly improve wellness, productivity, metabolism or comfort, improve performance of mental and/or physical tasks, increase alertness, quality of life and pleasure, reduce drowsiness, and aid in curing and preventing disease.

The method of modified ambient oxygen level can be practiced in numerous enclosed spaces or compartments. It can be used in a residence, room, house, apartment, building, theater, shopping center, hotel, office, industrial facility, commercial facility, commercial venue, passenger car, truck, van, bus, tractor, ship, boat, submarine, aircraft, train or subway car to help people improve their wellness, productivity, metabolism or comfort, improve performance of mental and/or physical tasks, increase their alertness, quality of life and pleasure, reduce their drowsiness, and aid in curing and preventing disease. This can be utilized by normally healthy individuals, in selected times and places and for older or sick individuals with weakened physical ability.

Higher oxygen levels may be needed for peak health, vitality, immune system function, and longevity. Scientific evidence suggests that the human body is meant to function at far higher concentrations of oxygen than it is currently getting, that the total dissolved oxygen content of most people's bodies today is considerably lower than what's needed to maintain health, high energy levels and proper metabolism, and that the lower the dissolved oxygen content is in a person's body, the greater the body's susceptibility to chronic illness and disease.

It is possible that insufficient oxygen results in insufficient biological energy that can further result in anything from mild fatigue to life threatening disease. Evidence suggests that a link between insufficient oxygen and disease has been firmly established. Some symptoms of oxygen deficiency include but are not limited to; overall bodily weakness, muscle aches, depression, dizziness, irritation, fatigue, memory loss, irrational behavior, chronic hostility, circulation problems, poor digestion, acid stomach, lowered immunity to colds, flu and infections, bronchial problems, tumors and deposit buildups, bacterial, viral and parasitic infections. These symptoms often begin with a vague feeling of uneasiness. They progress over time, to full-blown illness and disease.

Other Embodiments

Although particular embodiments have been disclosed herein in detail, this has been done by way of example for purposes of illustration only, and is not intended to be limiting with respect to the scope of the appended claims, which follow. In particular, it is contemplated by the inventors that various substitutions, alterations, and modifications may be made to the invention without departing from the spirit and scope of the invention as defined by the claims. For example, a variety of other oxygen generating systems or chemical reactions might be used to generate oxygen for use in the invention. A variety of control systems can also be used to regulate the oxygen content or flow rate of the enriched air that is fed into the enclosed space. Such control systems could vary, for example, the electrical power that is provided to the electrolyzing unit or to the compressors. Dampers could also be used to regulate the flow of oxygen-enriched air into the enclosed space in the several embodiments selected for illustration. The claims presented are representative of the inventions disclosed herein. Other, unclaimed inventions are also contemplated. Applicants reserve the right to pursue such inventions in later claims.

What is claimed is:

1. A system for supplying oxygen-enriched air to an enclosed space, said system comprising:
   means for producing oxygen-enriched air;
   a) a conduit for flowing said oxygen-enriched air into said enclosed space;
   b) an oxygen concentration sensor for measuring the oxygen content of air in said enclosed space; and
   c) means for maintaining the oxygen concentration of the air in said enclosed space within a safe range.

2. The system of claim 1, wherein said means for maintaining the oxygen content of the air in said enclosed space comprises a sensor for measuring the oxygen content of said oxygen-enriched air and a regulator for regulating the flow of oxygen-enriched air into said enclosed space to commence the flow of oxygen when the oxygen content in said enclosed space falls below a first pre-selected level and to stop the flow when the oxygen content in said enclosed space rises above a second pre-selected level.

3. The system of claim 2, wherein said first pre-selected level is about 21% oxygen by volume.

4. The system of claim 2, wherein said second pre-selected level is about 40% oxygen by volume.

5. The system of claim 1, wherein said oxygen concentration of the air in said enclosed space is maintained at any percentage between 21–40% oxygen by volume.

6. The system of claim 5, wherein any percentage between 21–40% oxygen by volume is determined and maintained by an oxystat.

7. The system of claim 1, wherein said system further comprises an oxygen battery.

8. The system of claim 7, wherein said oxygen battery rapidly increases the oxygen concentration of an enclosed space within a safe range.

9. The system of claim 8, wherein said oxygen battery is a refillable container.

10. The system of claim 9, wherein said oxygen battery is filled by said oxygen producing means.

11. The system of claim 1, wherein said enclosed space is selected from the group consisting of: residence, room, house, apartment, building, theater, shopping center, hotel, office, industrial facility, commercial facility and commercial venue.

12. The system of claim 1, wherein said means for producing oxygen-enriched air comprises a molecular sieve pressure cycle mechanism.

13. The system of claim 12, wherein said molecular sieve pressure cycle mechanism is a pressure swing adsorption apparatus.

14. The system of claim 1, wherein said means for producing oxygen-enriched air comprises a cryogenic separation mechanism.

15. The system of claim 1, wherein said means for producing oxygen-enriched air comprises an electrolyzing device.

16. The system of claim 1, wherein said means for producing oxygen-enriched air comprises an oxygen tank.

17. The system of claim 1, wherein said means for producing oxygen-enriched air comprises at least one gas separation membrane.

18. The system of claim 1, further comprising an oxygen shunt, wherein said shunt directs produced oxygen to the oxygen battery when the enclosed space is opened to ambient air.

19. A method for supplying oxygen-enriched air to a enclosed space, said method comprising the system of claim 1, wherein said method increases the oxygen concentration of the air in said enclosed space within a safe range for a prolonged period of time.

20. The method of claim 19, wherein said prolonged period of time is an exposure of at least 3 hours per day, or at least 4 exposures per week each for a time of 3 hours.

21. The method of claim 19, wherein supplying oxygen-enriched air to a enclosed space for a prolonged period of time helps people improve their wellness, productivity, metabolism or comfort, improve performance of mental and/or physical tasks, increase their alertness, quality of life and pleasure, reduce their drowsiness, and aid in curing and preventing disease.

22. A system for supplying oxygen-enriched air to an enclosed space, said system comprising:
   a) a pressure swing adsorption apparatus for producing oxygen-enriched air;
   b) a conduit for flowing said oxygen-enriched air from said apparatus into said enclosed space;
   c) an oxygen concentration sensor for measuring the oxygen content of air in said enclosed space; and
   d) means for maintaining the oxygen content of the air in said enclosed space within a safe range.

23. The system of claim 22, wherein said means for maintaining the oxygen content of the air in said enclosed space comprises a sensor for measuring the oxygen content of said oxygen-enriched air and a regulator for regulating the flow of oxygen-enriched air into said enclosed space to commence the flow of oxygen when the oxygen content in said enclosed space falls below a first pre-selected level and to stop the flow when the oxygen content in said enclosed space rises above a second pre-selected level.

24. The system of claim 23, wherein said first pre-selected level is about 21% oxygen by volume.

25. The system of claim 23, wherein said second pre-selected level is about 40% oxygen by volume.

26. The system of claim 22, wherein said oxygen concentration of the air in said enclosed space is maintained at any percentage between 21–40% oxygen by volume.

27. The system of claim 26, wherein any percentage between 21–40% oxygen by volume is determined and maintained by an oxystat.

28. The system of claim 22, wherein said system further comprises an oxygen battery.

29. The system of claim 22, wherein said oxygen battery rapidly increases the oxygen concentration of an enclosed space within a safe range.

30. The system of claim 29, wherein said oxygen battery is a refillable container.

31. The system of claim 30, wherein said oxygen battery is filled by said pressure swing adsorption apparatus.

32. The system of claim 22, wherein said enclosed space is selected from the group consisting of residence, room, house, apartment, building, theater, shopping center, hotel, office, industrial facility, commercial facility and commercial venue.

33. The system of claim 22, further comprising an automatic shutoff system, wherein said automatic shutoff system prevents oxygen from being directed to the enclosed space when the enclosed space is opened to ambient air or when a fire hazard is identified.

34. The system of claim 33, wherein said fire hazard is identified by a smoke detector, fire alarm, sprinkler system, infra-red sensing or other means of detecting fire.

35. The system of claim 22, further comprising an oxygen shunt, wherein said shunt directs produced oxygen to the oxygen battery when the enclosed space is opened to ambient air.

36. The system of claim 22, wherein said pressure swing adsorption apparatus selectively removes pollutants and unwanted gases from ambient air, such that purified oxygen-enriched air is produced.

37. The system of claim 22, wherein said pressure swing adsorption apparatus is a closed loop system, such that said closed loop pressure swing adsorption apparatus receives oxygen feedstock from said enclosed space for producing oxygen-enriched air for said enclosed space.

38. The system of claim 22, wherein said conduit is incorporated into a ventilation or climate control system for flowing said oxygen-enriched air from said apparatus into said enclosed space.

39. The system of claim 38, wherein said ventilation or climate control system is selected from the group consisting of central air-conditioning system, central heating system, central ventilation system, standalone window unit and stand alone room unit.

40. The system of claim 22, wherein said pressure swing adsorption system is designed to produce partially enriched air with oxygen concentration of 22% to 75% by volume.

41. The system of claim 40, wherein said partial elevation of oxygen concentration allows higher throughput of enriched air.

42. The system of claim 40, wherein said partial concentration of oxygen is obtained by shortening the duration of the adsorption cycle.

43. The system of claim 40, wherein said pressure swing adsorption system is capable of easily changing its output gas to any desired level of oxygen concentration simply by changing the timing and duration of the pressure cycle.

44. The system of claim 40, wherein said partial concentration of oxygen is obtained by reducing the volume or capacity of the molecular sieve.

45. The system of claim 40, wherein said partial concentration of oxygen is obtained by increasing the pressure differential during the cycle.

46. The system of claim 40, wherein said pressure swing adsorption system removes carbon dioxide, carbon monoxide and other unwanted gases from the enriched air without necessarily elevating its oxygen concentration.

47. A method for supplying oxygen-enriched air to a enclosed space, said method comprising the system of claim 22, wherein said method increases the oxygen concentration of the air in said enclosed space within a safe range for a prolonged period of time.

48. The method of claim 47, wherein said prolonged period of time is an exposure of at least 3 hours per day, or at least 4 exposures per week each for a time of 3 hours.

49. The method of claim 47, wherein supplying oxygen-enriched air to a enclosed space for a prolonged period of time helps people improve their wellness, productivity, metabolism or comfort, improve performance of mental and/or physical tasks, increase their alertness, quality of life and pleasure, reduce their drowsiness, and aid in curing and preventing disease.

50. A system for supplying oxygen enriched air to an enclosed space in a vehicle, said system comprising:
 a) a pressure swing adsorption apparatus for producing oxygen-enriched air;
 b) a conduit for flowing said oxygen-enriched air from said apparatus into said enclosed space;
 c) an oxygen battery;
 d) an oxygen concentration sensor for measuring the oxygen content of air in said enclosed space; and
 e) means for maintaining the oxygen content of the air in said enclosed space within a safe range, wherein said safe range is 26–40% oxygen by volume.

51. The system of claim 50, wherein said oxygen concentration of the air in said enclosed space is maintained at any percentage between 26–40% oxygen by volume.

52. The system of claim 51, wherein any percentage between 26–40% oxygen by volume is determined and maintained by an oxystat.

53. The system of claim 50, wherein said oxygen battery rapidly increases the oxygen concentration of an enclosed space within a safe range.

54. The system of claim 53, wherein said oxygen battery is a refillable container.

55. The system of claim 54, wherein said oxygen battery is filled by said pressure swing adsorption apparatus.

56. The system of claim 50, wherein said vehicle is selected from the group consisting of passenger car, truck, van, bus, tractor, ship, boat, submarine, aircraft, train and subway car.

57. The system of claim 50, further comprising an automatic shutoff system, wherein said automatic shutoff system prevents oxygen from being directed to the enclosed space when the enclosed space is opened to ambient air or when a fire hazard is identified.

58. The system of claim 57, wherein said fire hazard is identified by a smoke detector, fire alarm, sprinkler system, infra-red sensing or other means of detecting fire.

59. The system of claim 50, further comprising an oxygen shunt, wherein said shunt directs produced oxygen to the oxygen battery when the enclosed space is opened to ambient air.

60. The system of claim 50, wherein said pressure swing adsorption apparatus selectively removes pollutants and unwanted gases from ambient air, such that purified oxygen-enriched air is produced.

61. The system of claim 50, wherein said pressure swing adsorption apparatus is a closed loop system, such that said closed loop pressure swing adsorption apparatus receives oxygen feedstock from said enclosed space for producing oxygen-enriched air for said enclosed space.

62. The system of claim 50, wherein said conduit is incorporated into a ventilation or climate control system for flowing said oxygen-enriched air from said apparatus into said enclosed space.

63. A method for supplying oxygen-enriched air to a enclosed space in a vehicle, said method comprising the system of claim 50, wherein said method increases the oxygen concentration of the air in said enclosed space within a safe range for a long period of time, wherein said safe range is 26–40% oxygen by volume.

64. The method of claim 63, wherein said prolonged period of time is an exposure of at least 1 hour per day.

65. The method of claim 63, wherein supplying oxygen-enriched air to a enclosed space for a prolonged period of time helps people improve their wellness, productivity, metabolism or comfort, improve performance of mental and/or physical tasks, increase their alertness, quality of life and pleasure, reduce their drowsiness, and aid in curing and preventing disease.

* * * * *